UNITED STATES PATENT OFFICE.

ADOLF HAHN, OF NEW YORK, N. Y., ASSIGNOR OF ONE-HALF TO CHRISTIAN P. HAESLOOP, OF BROOKLYN, NEW YORK.

OIL OR VEHICLE FOR PAINTS, COLORS, AND PIGMENTS.

946,126.

Specification of Letters Patent. Patented Jan. 11, 1910.

No Drawing. Application filed August 10, 1909. Serial No. 512,109.

*To all whom it may concern:*

Be it known that I, ADOLF HAHN, a citizen of the Empire of Germany, and a resident of the borough of Brooklyn, New York city, in the county of Kings and State of New York, have invented certain new and useful Improvements in Oils or Vehicles for Paints, Colors, and Pigments, of which the following is a specification.

This invention relates to a novel liquid vehicle for paints, colors and pigments.

It is the special object of my invention to produce an efficient and quickly drying vehicle by means of a simple and inexpensive process. Accordingly the novel vehicle is cheaper than the oils heretofore used for better brands of paints.

In addition to these main objects the novel vehicle and paint or pigment are quickly mixed without difficulty and the resulting liquid paint is easily applied to the surfaces to be coated therewith. For better work boiled linseed oil is generally used but this is rather expensive. I have produced a novel vehicle which is considerably cheaper than boiled linseed oil but answers the same purposes as to quality of work and quickness of drying. If desired the vehicle may be thinned with spirits of turpentine which facilitates the application of the paint and driers may also be incorporated, but for many purposes this is not necessary.

In carrying the invention into effect I substantially proceed as follows:

The novel vehicle consists essentially of three components, boiled linseed oil which forms the principal constituent of same, an aqueous solution of starch and an aqueous solution of commercial caustic potash.

In the preparation of the vehicle the commercial boiled linseed oil is used. The aqueous starch solution is prepared in the usual manner by gradually stirring it into cold water so as to avoid the formation of little lumps. Separately from the starch solution, commercial caustic potash is dissolved in water. These two solutions are then mixed while violently stirring and agitating the mixture. During the mixing of the starch solution and the solution of caustic potash, heat is produced by chemical reaction and a semi-liquid, pasty mass results. When this mixture is finished and while still hot the boiled linseed oil is poured in and the entire mass violently stirred and agitated until a uniform homogeneous composition is obtained which is liquid and of oily consistency. When completely cold the vehicle thus produced is ready for use and may be mixed with the paints, colors or pigments.

The proportions in which the components of this composition are used may vary considerably. It is self evident that a paint for outdoor work must vary in its composition from a paint for indoor work. Likewise a paint required to dry quickly must be prepared with a different vehicle from a paint which may be allowed to dry slowly.

For general purposes a vehicle for paints may be prepared in substantially the following manner: First 1 pound of starch is dissolved in two gallons of cold water by gradually stirring the starch into the water so as to avoid the formation of little undissolved lumps. Then a solution of commercial caustic potash is prepared by dissolving 1 pound of caustic potash in 2 gallons of water. To the starch solution 3 liquid ounces of the caustic potash solution are gradually added while violently stirring. During mixing these two solutions heat develops by chemical reaction as above stated and a semi-liquid, pasty mass results to which, while still hot, 10 gallons of boiled linseed oil are gradually added while violently stirring until a composition results which is liquid and of oily consistency.

The vehicle thus prepared is fully an equivalent for the boiled linseed oil but is considerably cheaper. As above stated the vehicle may be thinned by spirits of turpentine and driers may be incorporated for special applications.

I claim as my invention:

1. The process of producing an oily vehicle for paints, colors and pigments consisting in compounding an aqueous starch solution prepared at ordinary temperature with an aqueous solution of caustic potash while stirring developing thereby reaction heat, adding while hot boiled linseed oil in suitable quantity, and agitating the mixture until an oily liquid results.

2. The process of producing an oily vehicle for paints, colors and pigments consisting in compounding an aqueous starch solution prepared at ordinary temperature with an aqueous solution of caustic potash while stirring developing thereby reaction heat, adding while hot boiled linseed oil in suitable quantity, agitating the mixture until an oily liquid results and thinning the oily vehicle with spirits of turpentine.

3. The process of producing an oily vehicle for paints colors and pigments consisting in compounding 2 gallons of starch solution containing one pound of starch with about 3 liquid ounces of a solution of caustic potash containing about 1/4 ounce of same while stirring, admixing therewith about 10 gallons of boiled linseed oil, and agitating the mixture until an oily liquid results.

4. As a novel composition of matter, a liquid vehicle for paints and pigments derived from a starch solution, a solution of caustic potash, and boiled linseed oil and existing in form of an oily liquid.

Signed at New York, N. Y., this 9th day of August, 1909.

ADOLF HAHN.

Witnesses:
 FLORA GREENWALD,
 JAMES H. GOGGIN.